United States Patent
Coelingh et al.

(10) Patent No.: US 10,106,135 B2
(45) Date of Patent: Oct. 23, 2018

(54) SAFETY STOPPAGE DEVICE AND METHOD FOR SAFETY STOPPAGE OF AN AUTONOMOUS VEHICLE

(71) Applicant: VOLVO CAR CORPORATION, Gothenburg (SE)

(72) Inventors: Erik Coelingh, Alvangen (SE); Leif Kindberg, Jorlanda (SE)

(73) Assignee: Volvo Car Corporation, Gothenburg (SE)

( * ) Notice: Subject to any disclaimer, the term of this patent is extended or adjusted under 35 U.S.C. 154(b) by 70 days.

(21) Appl. No.: 15/203,010

(22) Filed: Jul. 6, 2016

(65) Prior Publication Data

US 2017/0015288 A1   Jan. 19, 2017

(30) Foreign Application Priority Data

Jul. 13, 2015   (EP) .................................... 15176439

(51) Int. Cl.
*G01C 22/00*   (2006.01)
*G05D 3/00*   (2006.01)
(Continued)

(52) U.S. Cl.
CPC ............... *B60T 8/26* (2013.01); *B60T 7/12* (2013.01); *B60T 7/22* (2013.01); *B60T 8/171* (2013.01);
(Continued)

(58) Field of Classification Search
CPC .......... B60T 2201/022; B60T 2210/32; B60T 2270/40; B60T 7/12; B60T 7/22;
(Continued)

(56) References Cited

U.S. PATENT DOCUMENTS 3,398,994 A * 8/1968 Smith ................... B60T 8/1705
                                                        303/129
8,855,849 B1   10/2014 Ferguson et al.
(Continued)

FOREIGN PATENT DOCUMENTS

DE          3936906 A1    5/1991
DE     102013213171 A1    1/2015

OTHER PUBLICATIONS

European Search Report and Written Opinion dated Feb. 25, 2016, from corresponding European application No. EP 15176439, 5 pp.

*Primary Examiner* — Harry Y Oh
(74) *Attorney, Agent, or Firm* — Brooks Kushman P.C.

(57) ABSTRACT

A safety stoppage device and method for safety stoppage of an autonomous vehicle including control networks and sensors for monitoring the autonomous vehicle surroundings and motion includes a brake-control unit for a brake system including wheel brakes of the autonomous vehicle, and a signaling processing system for processing sensor signals enabling an autonomous drive mode thereof. Where a drivable space exists is predicted based on data from the sensors and sensor fusion, and a safe trajectory to a stop within the drivable space is calculated and sent to the brake-control unit and stored therein. The brake-control unit is shielded against electromagnetic compatibility problems and configured to monitor if the control networks are operational and, if determined incapacitated, control the autonomous vehicle to follow the most recently calculated safe trajectory to a stop within the drivable space using differential braking of the wheel brakes thereof in order to effectuate steering.

15 Claims, 1 Drawing Sheet

(51) Int. Cl.
*B60T 8/26* (2006.01)
*B60W 10/18* (2012.01)
*G05D 1/02* (2006.01)
*B60T 7/12* (2006.01)
*B60T 8/171* (2006.01)
*B60T 8/172* (2006.01)
*G05D 1/00* (2006.01)
*B60T 7/22* (2006.01)
*B60W 50/02* (2012.01)
*G06K 9/00* (2006.01)
*B60W 50/00* (2006.01)

(52) U.S. Cl.
CPC ............ *B60T 8/172* (2013.01); *B60W 10/18* (2013.01); *B60W 50/02* (2013.01); *G05D 1/0088* (2013.01); *G05D 1/0214* (2013.01); *G05D 1/0223* (2013.01); *G06K 9/00791* (2013.01); *B60T 2201/022* (2013.01); *B60T 2210/32* (2013.01); *B60T 2270/40* (2013.01); *B60W 2050/0008* (2013.01); *B60W 2050/0012* (2013.01); *B60Y 2302/05* (2013.01); *G05D 2201/0212* (2013.01)

(58) Field of Classification Search
CPC ............ B60T 8/171; B60T 8/172; B60T 8/26; B60W 10/18; G05D 1/0088; G05D 1/0214; G05D 1/0223; G05D 2201/0212; G06K 9/00805
USPC .......................................................... 701/25
See application file for complete search history.

(56) References Cited

U.S. PATENT DOCUMENTS

| 9,523,984 | B1* | 12/2016 | Herbach | B62D 15/025 |
| 2004/0102888 | A1* | 5/2004 | Burgdorf | B60T 8/171 |
| | | | | 701/70 |
| 2013/0030651 | A1 | 1/2013 | Moshchuk et al. | |
| 2016/0052495 | A1* | 2/2016 | Nakaso | B60T 7/22 |
| | | | | 701/70 |

* cited by examiner

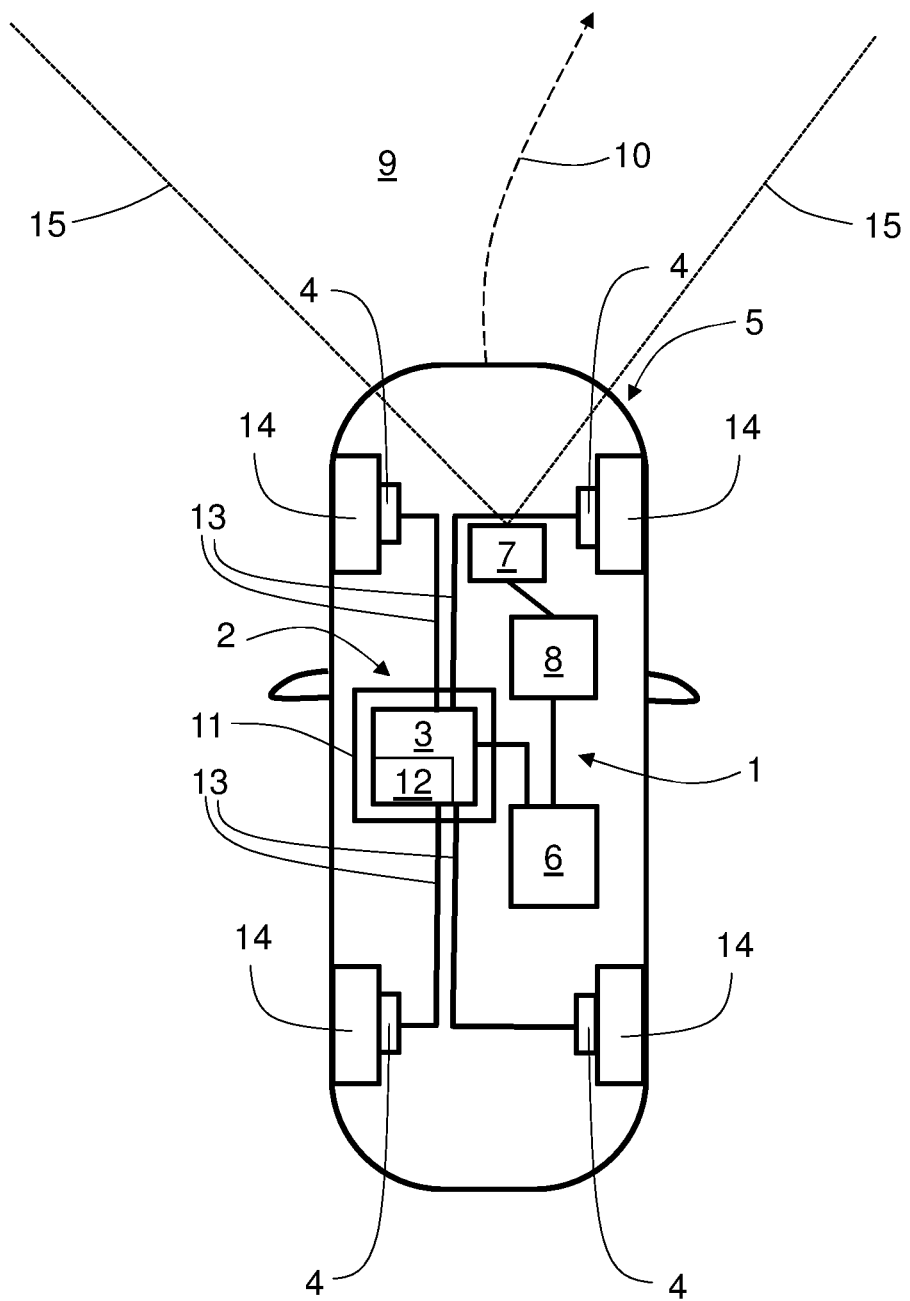

SAFETY STOPPAGE DEVICE AND METHOD FOR SAFETY STOPPAGE OF AN AUTONOMOUS VEHICLE

CROSS-REFERENCE TO RELATED APPLICATIONS

This application claims foreign priority benefits under 35 U.S.C. § 119(a)-(d) to European patent application number EP 15176439.6 filed Jul. 13, 2015, which is incorporated herein by reference in its entirety.

TECHNICAL FIELD

The present disclosure relates to a safety stoppage device adapted for a brake system including a brake-control unit and wheel brakes of an autonomous vehicle further having control networks and sensors for monitoring the autonomous vehicle surroundings and motion, and a signaling processing system for processing sensor signals enabling an autonomous drive mode of the autonomous vehicle. The disclosure further relates to a method for safety stoppage using a brake system including a brake-control unit and wheel brakes of an autonomous vehicle further having control networks and sensors for monitoring the autonomous vehicle surroundings and motion, and a signaling processing system for processing sensor signals enabling an autonomous drive mode of the autonomous vehicle. The disclosure further relates to an autonomous vehicle having a brake system including a brake-control unit and wheel brakes of an autonomous vehicle, and the autonomous vehicle further having control networks and sensors for monitoring the autonomous vehicle surroundings and motion, and a signaling processing system for processing sensor signals enabling an autonomous drive mode of the autonomous vehicle and comprising a safety stoppage device.

BACKGROUND

One area of automotive vehicle technology that is evolving rapidly is the area of autonomous or semi-autonomous drive capabilities. This is enabled through the introduction of sensors, for sensing vehicle motion and surroundings, and actuators, for controlling different vehicle functionalities, such as steering, throttling and braking. Increased on-board data processing capabilities ties together these sensors and actuators such that the autonomous or semi-autonomous drive capabilities are enabled.

When the vehicle runs in autonomous mode, which means the driver is not required to perform maneuvers, the vehicle usually is dependent on multiple data sources as inputs to perform the autonomous driving, such as detection of surrounding vehicles, traffic lanes, obstacles, data from navigation systems and so on. Provisions of such inputs are usually dependent on control networks, sensors and signaling systems for enabling the autonomous drive mode. However, should one or more of these inputs not be available, e.g. due to electromagnetic compatibility problems, rendering one or more of the systems providing such necessary inputs inoperative, there might not be sufficient information to perform autonomous driving.

Thus there is a need for a solution to safely handle a situation where a fault due to electromagnetic compatibility problems renders control systems of an autonomous vehicle unable to continue ongoing performance of autonomous driving.

SUMMARY

Embodiments herein aim to provide an improved safety stoppage device capable to safely bring an autonomous vehicle to a halt in case of a fault due to electromagnetic compatibility problems rendering the control systems thereof unable to perform autonomous driving.

This is provided through a safety stoppage device adapted for a brake system including a brake-control unit and wheel brakes of an autonomous vehicle further having control networks and sensors for monitoring the autonomous vehicle surroundings and motion, and a signaling processing system for processing sensor signals enabling an autonomous drive mode of the autonomous vehicle, wherein: the signaling processing system further is arranged or configured to continuously predict where a drivable space exists, based on data from the sensors and sensor fusion; the signaling processing system further is arranged or configured to continuously calculate a safe trajectory to a stop within the drivable space; the signaling processing system further being arranged or configured to send the calculated safe trajectory to the brake-control unit; the brake-control unit further is shielded against electromagnetic compatibility problems; the brake-control unit further is arranged or configured to continuously store a most recently calculated safe trajectory to a stop within the drivable space; the brake-control unit further is arranged or configured to monitor if the control networks of the autonomous vehicle are operational; wherein, if the brake-control unit determines that the control networks of the autonomous vehicle are incapacitated, the brake-control unit is arranged or configured to control the wheel brakes of the autonomous vehicle to follow the most recently calculated safe trajectory to a stop within the drivable space using differential braking of the wheel brakes in order to effectuate steering along this safe trajectory.

According to a second embodiment is provided that the signaling processing system is arranged or configured to continuously calculate the safe trajectory to a stop within the drivable space as the trajectory incurring the lowest risk of the autonomous vehicle becoming involved in a serious accident.

The provision of continuously calculating the safe trajectory to a stop within the drivable space as the trajectory incurring the lowest risk of the autonomous vehicle becoming involved in a serious accident allows for using as safe trajectories, trajectories that not necessarily are one hundred percent safe, although minimizing the risk from the available options.

According to a third embodiment is provided that the brake-control unit is shielded against electromagnetic compatibility problems by a conductive enclosure.

The provision of having the brake-control unit shielded against electromagnetic compatibility problems by a conductive enclosure provides an efficient way of ensuring that the brake-control unit will remain operational even if the control systems of the autonomous vehicle are rendered unable to perform autonomous driving due to electromagnetic compatibility problems.

According to a fourth embodiment is provided that the conductive enclosure is a metallic housing surrounding the brake-control unit.

The provision of a metallic housing surrounding the brake-control unit forming the conductive enclosure is a well proven and cost effective way of giving the brake-control unit protection against electromagnetic compatibility problems.

According to a fifth embodiment is provided that the brake-control unit is arranged or configured to control the wheel brakes of the autonomous vehicle to follow the most recently calculated safe trajectory using an open-loop brake-controller.

The provision of the brake-control unit being arranged or configured to control the wheel brakes of the autonomous vehicle to follow the most recently calculated safe trajectory using an open-loop brake-controller is a simple, well proven and cost-efficient way of realizing a brake-controller suitable to be used therefore.

According to a sixth embodiment is provided that the brake-control unit is arranged or configured to control the wheel brakes of the autonomous vehicle to follow the most recently calculated safe trajectory using a closed-loop brake-controller.

The provision of the brake-control unit being arranged or configured to control the wheel brakes of the autonomous vehicle to follow the most recently calculated safe trajectory using a closed-loop brake-controller is an alternative, well proven and cost-efficient way of realizing a brake-controller suitable to be used therefore allowing improved performance, as compared to an open-loop brake-controller, due to the closed-loop brake-controller using feedback to control states or outputs of the brake-control unit.

According to a seventh embodiment is provided that the closed-loop brake-controller is arranged or configured to use feedback on its adherence to the most recently calculated safe trajectory from a course determination unit integrated to the brake-control unit.

The provision of the closed-loop brake-controller being arranged or configured to use feedback on its adherence to the most recently calculated safe trajectory from a course determination unit integrated to the brake-control unit ensures that the feedback on its adherence to the most recently calculated safe trajectory will be available to the closed-loop brake-controller even in case of a fault due to electromagnetic compatibility problems rendering the control systems of the autonomous vehicle unable to perform autonomous driving.

Embodiments herein also aim to provide an improved method for safely bringing an autonomous vehicle to a halt in case of a fault due to electromagnetic compatibility problems rendering the control systems thereof unable to perform autonomous driving.

Thus, according to an eighth embodiment this is provided through a method for safety stoppage using a brake system including a brake-control unit and wheel brakes of an autonomous vehicle further having control networks and sensors for monitoring the autonomous vehicle surroundings and motion, and a signaling processing system for processing sensor signals enabling an autonomous drive mode of the autonomous vehicle, wherein the method comprises: continuously predicting, by the signaling processing system, where a drivable space exists, based on data from the sensors and sensor fusion; continuously calculating, by the signaling processing system, a safe trajectory to a stop within the drivable space; sending the calculated safe trajectory to the brake-control unit; shielding the brake-control unit against electromagnetic compatibility problems; continuously storing, in the brake-control unit a most recently calculated safe trajectory to a stop within the drivable space; monitoring, by the brake-control unit if the control networks of the autonomous vehicle are operational; and if it is determined that the control networks of the autonomous vehicle are incapacitated, controlling, by the brake-control unit the wheel brakes of the autonomous vehicle to follow the most recently calculated safe trajectory to a stop within the drivable space using differential braking of the wheel brakes in order to effectuate steering along this safe trajectory.

According to a ninth embodiment is provided that that the method further comprises continuously calculating the safe trajectory to a stop within the drivable space as the trajectory incurring the lowest risk of the autonomous vehicle becoming involved in a serious accident.

The provision of continuously calculating the safe trajectory to a stop within the drivable space as the trajectory incurring the lowest risk of the autonomous vehicle becoming involved in a serious accident allows for using as safe trajectories, trajectories that not necessarily are one hundred percent safe, although minimizing the risk from the available options.

According to a tenth embodiment is provided that the method further comprises shielding the brake-control unit against electromagnetic compatibility problems using a conductive enclosure.

The provision of shielding the brake-control unit against electromagnetic compatibility problems using a conductive enclosure provides an efficient way of ensuring that the brake-control unit will remain operational even if the control systems of the autonomous vehicle are rendered unable to perform autonomous driving due to electromagnetic compatibility problems.

According to an eleventh embodiment is provided that the method further comprises shielding the brake-control unit against electromagnetic compatibility problems through arranging a metallic housing to surround the brake-control unit as the conductive enclosure.

The provision of shielding the brake-control unit against electromagnetic compatibility problems through arranging a metallic housing to surround the brake-control unit as the conductive enclosure provides an efficient way of ensuring that the brake-control unit will remain operational even if the control systems of the autonomous vehicle are rendered unable to perform autonomous driving due to electromagnetic compatibility problems.

According to a twelfth embodiment is provided that the method further comprises arranging or configuring the brake-control unit to control the wheel brakes of the autonomous vehicle to follow the most recently calculated safe trajectory using an open-loop brake-controller.

The provision of arranging or configuring the brake-control unit to control the wheel brakes of the autonomous vehicle to follow the most recently calculated safe trajectory using an open-loop brake-controller is a simple, well proven and cost-efficient way of realizing a brake-controller suitable to be used therefore.

According to an thirteenth embodiment is provided that the method further comprises arranging or configuring the brake-control unit to control the wheel brakes of the autonomous vehicle to follow the most recently calculated safe trajectory using a closed-loop brake-controller.

The provision of arranging or configuring the brake-control unit to control the wheel brakes of the autonomous vehicle to follow the most recently calculated safe trajectory using a closed-loop brake-controller is an alternative, well proven and cost-efficient way of realizing a brake-controller suitable to be used therefore allowing improved performance, as compared to an open-loop brake-controller, due to the closed-loop brake-controller using feedback to control states or outputs of the brake-control unit.

According to an fourteenth embodiment is provided that the method further comprises arranging or configuring the closed-loop brake-controller to use feedback on its adherence to the most recently calculated safe trajectory from a course determination unit integrated to the brake-control unit.

The provision of arranging or configuring the closed-loop brake-controller to use feedback on its adherence to the most recently calculated safe trajectory from a course determination unit integrated to the brake-control unit ensures that the feedback on its adherence to the most recently calculated safe trajectory will be available to the closed-loop brake-controller even in case of a fault due to electromagnetic compatibility problems rendering the control systems of the autonomous vehicle unable to perform autonomous driving.

According to another embodiment is provided an autonomous vehicle having a brake system including a brake-control unit and wheel brakes of an autonomous vehicle, and the autonomous vehicle further having control networks and sensors for monitoring the autonomous vehicle surroundings and motion, and a signaling processing system for processing sensor signals enabling an autonomous drive mode of the autonomous vehicle, that comprises a safety stoppage device as above.

An autonomous vehicle as above is able to safely bring itself to a halt in case of a fault due to electromagnetic compatibility problems rendering the control systems thereof unable to perform autonomous driving.

BRIEF DESCRIPTION OF THE DRAWINGS

In the following, embodiments herein will be described in greater detail by way of example only with reference to attached drawings, in which FIG. 1 is a schematic illustration of an autonomous vehicle comprising a safety stoppage device according to embodiments herein.

Still other features and embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The present disclosure proposes, and illustrates in FIG. 1, a solution to provide an improved safety stoppage device 1 capable to safely bring an autonomous vehicle 5 to a halt in case of a fault due to electromagnetic compatibility problems rendering the control systems thereof unable to perform autonomous driving.

The autonomous vehicle 5 according to FIG. 1 comprises a brake system 2 including a brake-control unit 3 and wheel brakes 4 arranged at the respective wheels 14 of the autonomous vehicle 5, and further has control networks 6, schematically illustrated as a box in FIG. 1, and sensors 7, such as e.g. based on camera, radar and lidar technologies, for monitoring the autonomous vehicle 5 surroundings and, e.g. yaw-rate sensors, accelerometers, gyroscopes and wheel speed sensors, for monitoring the autonomous vehicle 5 motion, as well as a signaling processing system 8 for processing sensor 7 signals, enabling an autonomous drive mode of the autonomous vehicle 5. The brake system 2 includes brake lines or brake control wiring 13 interconnecting the brake-control unit 3 and the wheel brakes 4.

Further details of the autonomous vehicle 5, such as steering and throttling control systems etc., are intentionally left out from FIG. 1, in order to not unnecessarily obscure details promoting the understanding of the safety stoppage device 1 according to the present disclosure. However, the person skilled in the art will readily be able to envisage such further details.

Thus, herein is suggested a safety stoppage device 1 adapted for a brake system 2 including a brake-control unit 3 and wheel brakes 4 of an autonomous vehicle 5 further having control networks 6 and sensors 7 for monitoring the autonomous vehicle 5 surroundings and motion, and a signaling processing system 8 for processing sensor 7 signals enabling an autonomous drive mode of the autonomous vehicle 5.

The signaling processing system 8 is further arranged or configured to continuously predict where a drivable space 9 exists in the autonomous vehicle 5 surroundings, based on data from the sensors 7 and sensor fusion. By sensor fusion is here understood the combining of sensory data or data derived from sensory data from disparate sources in addition to the sensors 7, such that the resulting information used to continuously predict where a drivable space 9 exists in the autonomous vehicle 5 surroundings has less uncertainty than would be possible when data from such sources were used individually. An example drivable space 9 is illustrated in FIG. 1 by the space between the dotted lines 15 emanating from the sensors 7.

The signaling processing system 8 is further arranged or configured to continuously calculate a safe trajectory 10 to a stop within the drivable space 9, i.e. taking into account any obstacles present within the drivable space 9, such as other vehicles, pedestrians and fixed roadside objects. The signaling processing system 8 is further also arranged or configured to send the calculated safe trajectory 10 to the brake-control unit 3. A simplified example of such a safe trajectory 10 is illustrated in FIG. 1 by the dashed arrow 10.

The brake-control unit 3 is further shielded against electromagnetic compatibility problems, and further arranged or configured to continuously store a most recently calculated safe trajectory 10 to a stop within the drivable space 9. It should be noted that the brake-control unit 3 may be a standard brake control unit with its normally applied shielding against electromagnetic compatibility problems, although suitably adapted to be used with the safety stoppage device 1 as described herein.

Still further, the brake-control unit 3 is arranged or configured to monitor if the control networks 6 of the autonomous vehicle 5 are operational. If the brake-control unit 3 determines that the control networks 6 of the autonomous vehicle 5 are incapacitated, the brake-control unit 3 is arranged or configured to control the wheel brakes 4 of the autonomous vehicle 5 to follow the most recently calculated safe trajectory 10 to a stop within the drivable space 9 using differential braking of the wheel brakes 4 in order to effectuate steering along this safe trajectory 10.

In some embodiments the signaling processing system 8 is arranged or configured to continuously calculate the safe trajectory 10 to a stop within the drivable space 9 as the trajectory incurring the lowest risk of the autonomous vehicle 5 becoming involved in a serious accident. This allows for using as safe trajectories 10, trajectories that not necessarily are one hundred percent safe, although minimizing the risk from the available options. Thus, in all instances, the trajectory incurring the lowest risk of the autonomous vehicle 5 becoming involved in a serious accident may be used, hence at least striving at minimizing the risk should it become necessary to safely bring the autonomous vehicle 5 to a halt in case of a fault due to electromagnetic compatibility problems rendering the control systems thereof unable to perform autonomous driving.

According to some further embodiments the brake-control unit 3 is shielded against electromagnetic compatibility problems by a conductive enclosure 11. Such a conductive enclosure 11 can e.g. provide electromagnetic interference (EMI) shielding by having metal coatings made by electroplating or vacuum deposition or be made of a composite material containing a conductive filler or from electrically conductive polymers, combinations thereof and similar. Hereby is provided an efficient way of ensuring that the brake-control unit 3 will remain operational even if the control systems of the autonomous vehicle 5 are rendered unable to perform autonomous driving due to electromagnetic compatibility problems. In some such embodiments the conductive enclosure 11 is a metallic housing surrounding the brake-control unit 3. Such a conductive enclosure 11 can e.g. provide EMI shielding through being made from sheet metal, a metal wire mesh, combinations thereof and similar. This is a well proven and cost effective way of giving the brake-control unit 3 protection against electromagnetic compatibility problems.

Should a power supply system of the autonomous vehicle (not shown) be sensitive to electromagnetic compatibility problems, it may in some instances be necessary to ensure that the power supply to the brake-control unit 3 is adequately protected against such electromagnetic compatibility problems, e.g. by conductive shielding, as above.

In yet some further embodiments the brake-control unit 3 is arranged or configured to control the wheel brakes 4 of the autonomous vehicle 5 to follow the most recently calculated safe trajectory 10 using an open-loop brake-controller. An open-loop brake-controller of this kind will normally compute its inputs for braking into the brake system 2 using only a current state of the autonomous vehicle 5 and a model of the autonomous vehicle 5 combined with data regarding the most recently calculated safe trajectory 10. This means that the open-loop brake-controller does not observe the outcome its effort to control the autonomous vehicle 5 to follow the most recently calculated safe trajectory 10. However, this is a simple, well proven and cost-efficient way of realizing a brake-controller suitable to be used therefore.

However, in still some alternative embodiments the brake-control unit 3 is arranged or configured to control the wheel brakes 4 of the autonomous vehicle 5 to follow the most recently calculated safe trajectory 10 using a closed-loop brake-controller. Using a closed-loop brake-controller is an attractive alternative, well proven and cost-efficient way of realizing a brake-controller suitable to be used therefore. A closed-loop brake-controller allows for improved performance, as compared to an open-loop brake-controller, due to the closed-loop brake-controller using feedback to control states or outputs of the brake-control unit 3 to adjust its course to more accurately follow the most recently calculated safe trajectory 10.

In some such embodiments the closed-loop brake-controller is arranged or configured to use feedback on its adherence to the most recently calculated safe trajectory 10 from a course determination unit 12 integrated to the brake-control unit 3. Examples of such course determination units 12 include, but are not limited to, yaw-rate sensors, accelerometers, gyroscopes, inertial navigation or guidance systems, compasses, gyrocompasses, satellite navigation systems (e.g. The Global Positioning System (GPS)), and any combination of such elements, and possibly also signals from other sensors, such as e.g. wheel speed sensors, if available. Furthermore, integration thereof to the brake-control unit 3 ensures that such course determination units 12 are adequately protected against electromagnetic compatibility problems by the conductive shielding of the brake-control unit 3.

The provision of the closed-loop brake-controller being arranged or configured to use feedback on its adherence to the most recently calculated safe trajectory 10 from a course determination unit 12 integrated to the brake-control unit 3 thus ensures that this feedback will be available to the closed-loop brake-controller even in case of a fault due to electromagnetic compatibility problems rendering the control systems of the autonomous vehicle 5 unable to perform autonomous driving.

Still further, the present disclosure also proposes an improved method for safely bringing an autonomous vehicle 5 to a halt in case of a fault due to electromagnetic compatibility problems rendering the control systems thereof unable to perform autonomous driving.

Thus, the present disclosure also proposes a method for safety stoppage using a brake system 2 including a brake-control unit 3 and wheel brakes 4 of an autonomous vehicle 5 further having control networks 6 and sensors 7 for monitoring the autonomous vehicle 5 surroundings and motion, and a signaling processing system 8 for processing sensor 7 signals enabling an autonomous drive mode of the autonomous vehicle 5.

The method comprises: continuously predicting, by the signaling processing system 8, where a drivable space 9 exists, based on data from the sensors 7 and sensor fusion; continuously calculating, by the signaling processing system 8, a safe trajectory 10 to a stop within the drivable space 9; and sending the calculated safe trajectory 10 to the brake-control unit 3; shielding the brake-control unit 3 against electromagnetic compatibility problems; continuously storing, in the brake-control unit 3 a most recently calculated safe trajectory 10 to a stop within the drivable space 9; monitoring, by the brake-control unit 3 if the control networks 6 of the autonomous vehicle 5 are operational; and if it is determined that the control networks 6 of the autonomous vehicle 5 are incapacitated, controlling, by the brake-control unit 3 the wheel brakes 4 of the autonomous vehicle 5 to follow the most recently calculated safe trajectory 10 to a stop within the drivable space 9 using differential braking of the wheel brakes 4 in order to effectuate steering along this safe trajectory 10.

In some embodiments the method further comprises continuously calculating the safe trajectory 10 to a stop within the drivable space 9 as the trajectory incurring the lowest risk of the autonomous vehicle 5 becoming involved in a serious accident. This allows for using as safe trajectories 10, trajectories that not necessarily are one hundred percent safe, although minimizing the risk from the available options.

In yet some further embodiments the method further comprises shielding the brake-control unit 3 against electromagnetic compatibility problems using a conductive enclosure 11. Hereby is provided an efficient way of ensuring that the brake-control unit 3 will remain operational even if the control systems of the autonomous vehicle 5 are rendered unable to perform autonomous driving due to electromagnetic compatibility problems.

According to still some further embodiments the method further comprises shielding the brake-control unit 3 against electromagnetic compatibility problems through arranging a metallic housing to surround the brake-control unit 3 as the conductive enclosure 11. This is an efficient way of ensuring that the brake-control unit 3 will remain operational even if the control systems of the autonomous vehicle 5 are rendered unable to perform autonomous driving due to electromagnetic compatibility problems.

In yet some embodiments the method further comprises arranging or configuring the brake-control unit 3 to control the wheel brakes 4 of the autonomous vehicle 5 to follow the most recently calculated safe trajectory 10 using an open-loop brake-controller. Using an open-loop brake-controller is a simple, well proven and cost-efficient way of realizing a brake-controller suitable to be used therefore.

According to still further embodiments the method further comprises arranging or configuring the brake-control unit 3 to control the wheel brakes 4 of the autonomous vehicle 5 to follow the most recently calculated safe trajectory 10 using a closed-loop brake-controller. Using a closed-loop brake-controller is an alternative, well proven and cost-efficient way of realizing a brake-controller suitable to be used therefore, allowing improved performance, as compared to an open-loop brake-controller, due to the closed-loop brake-controller using feedback on its adherence to the most recently calculated safe trajectory 10 to control states or outputs of the brake-control unit 3 for the following thereof.

In some still further embodiments relying on such a closed-loop brake-controller the method further comprises arranging or configuring the closed-loop brake-controller to use feedback on its adherence to the most recently calculated safe trajectory 10 from a course determination unit 12 integrated to the brake-control unit 3. Such integration of a course determination unit 12 into the brake-control unit 3 ensures, due to the conductive shielding, that the feedback on its adherence to the most recently calculated safe trajectory 10 will be available to the closed-loop brake-controller even in case of a fault due to electromagnetic compatibility problems rendering the control systems of the autonomous vehicle 5 unable to perform autonomous driving.

Finally, the present disclosure also proposes an autonomous vehicle 5 having a brake system 2 including a brake-control unit 3 and wheel brakes 4 of an autonomous vehicle 5, and the autonomous vehicle 5 further having control networks 6 and sensors 7 for monitoring the autonomous vehicle 5 surroundings and motion, and a signaling processing system 8 for processing sensor 7 signals enabling an autonomous drive mode of the autonomous vehicle 5, that comprises a safety stoppage device 1 as described above.

It should be noted that the brake system 2, brake-control unit 3, control networks 6, sensors 7, signaling processing system 8, course determination unit 12 and/or any other arrangement, system, control unit, controller, unit and/or device described herein may comprise one or more appropriately programmed processors (e.g., one or more microprocessors including central processing units (CPU)) and associated memory, which may include stored operating system software and/or application software executable by the processor(s) for controlling operation thereof and for performing the particular algorithms represented by the various functions and/or operations described herein, including interaction between and/or cooperation with each other.

An autonomous vehicle 5, as described above, is able to safely bring itself to a halt in case of a fault due to electromagnetic compatibility problems rendering the control systems thereof unable to perform autonomous driving.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A safety stoppage device for an autonomous vehicle having a control network and sensors for monitoring surroundings and motion of the autonomous vehicle, the safety stoppage device comprising:
   a brake-control unit for a brake system including wheel brakes of the autonomous vehicle, the brake-control unit comprising a processor;
   a signaling processing system comprising a processor for processing sensor signals enabling an autonomous drive mode of the autonomous vehicle, wherein the signaling processing system is configured to predict where a drivable space exists based on data from the sensors, calculate a safe trajectory to a stop within the drivable space, and send the calculated safe trajectory to the brake-control unit via the control network;
   wherein the brake-control unit is shielded against electromagnetic interference, and is configured to store a most recently calculated safe trajectory to a stop within the drivable space, and monitor if the control network of the autonomous vehicle is operational;
   wherein, if the brake-control unit determines that the control network of the autonomous vehicle is incapacitated, the brake-control unit is configured to control the wheel brakes of the autonomous vehicle to follow the most recently calculated safe trajectory to a stop within the drivable space stored by the brake-control unit using differential braking of the wheel brakes in order to effectuate steering along the safe trajectory.

2. The safety stoppage device according to claim 1 wherein the signaling processing system is configured to continuously calculate the safe trajectory to a stop within the drivable space as the trajectory incurring the lowest risk of the autonomous vehicle becoming involved in an accident.

3. The safety stoppage device according to claim 1 wherein the brake-control unit is shielded against electromagnetic compatibility problems by a conductive enclosure.

4. The safety stoppage device according to claim 3 wherein the conductive enclosure is a metallic housing surrounding the brake-control unit.

5. The safety stoppage device according to claim 1 wherein the brake-control unit is configured to control the wheel brakes of the autonomous vehicle to follow the most recently calculated safe trajectory using an open-loop brake-controller comprising a processor.

6. The safety stoppage device according to claim 1 wherein the brake-control unit is configured to control the wheel brakes of the autonomous vehicle to follow the most recently calculated safe trajectory using a closed-loop brake-controller comprising a processor.

7. The safety stoppage device according to claim 6 wherein the closed-loop brake-controller is configured to use feedback on its adherence to the most recently calculated safe trajectory from a course determination unit comprising a processor integrated to the brake-control unit.

8. A method for safety stoppage using a brake system including a brake-control unit and wheel brakes of an autonomous vehicle, the brake-control unit comprising a processor, the autonomous vehicle having a control network and sensors for monitoring surroundings and motion of the autonomous vehicle, and a signaling processing system comprising a processor for processing sensor signals enabling an autonomous drive mode of the autonomous vehicle, the method comprising:
  predicting, by the signaling processing system, where a drivable space exists based on data from the sensors;
  calculating, by the signaling processing system, a safe trajectory to a stop within the drivable space;
  sending the calculated safe trajectory to the brake-control unit via the control network;
  shielding the brake-control unit against electromagnetic interference;
  storing, in the brake-control unit, a most recently calculated safe trajectory to a stop within the drivable space;
  monitoring, by the brake-control unit, if the control network of the autonomous vehicle is operational; and
  if it is determined that the control network of the autonomous vehicle is incapacitated, controlling, by the brake-control unit, the wheel brakes of the autonomous vehicle to follow the most recently calculated safe trajectory to a stop within the drivable space stored by the brake-control unit using differential braking of the wheel brakes in order to effectuate steering along the safe trajectory.

9. The method according to claim 8 further comprising calculating the safe trajectory to a stop within the drivable space as the trajectory incurring the lowest risk of the autonomous vehicle becoming involved in an accident.

10. The method according to claim 8 further comprising shielding the brake-control unit against electromagnetic compatibility problems using a conductive enclosure.

11. The method according to claim 10 further comprising shielding the brake-control unit against electromagnetic compatibility problems through arranging a metallic housing to surround the brake-control unit as the conductive enclosure.

12. The method according to claim 8 further comprising controlling, by the brake-control unit, the wheel brakes of the autonomous vehicle to follow the most recently calculated safe trajectory using an open-loop brake-controller comprising a processor.

13. The method according to claim 8 further comprising controlling, by the brake-control unit, the wheel brakes of the autonomous vehicle to follow the most recently calculated safe trajectory using a closed-loop brake-controller comprising a processor.

14. The method according to claim 13 wherein the closed-loop brake-controller uses feedback on its adherence to the most recently calculated safe trajectory from a course determination unit comprising a processor integrated to the brake-control unit.

15. An autonomous vehicle comprising:
  a brake system including wheel brakes;
  a control network and sensors for monitoring surroundings and motion of the autonomous vehicle; and
  a safety stoppage device comprising:
    a brake-control unit for the brake system, the brake-control unit comprising a processor;
    a signaling processing system comprising a processor for processing sensor signals enabling an autonomous drive mode of the autonomous vehicle;
  wherein the signaling processing system is configured to predict where a drivable space exists based on data from the sensors, calculate a safe trajectory to a stop within the drivable space, and send the calculated safe trajectory to the brake-control unit via the control network;
  wherein the brake-control unit is shielded against electromagnetic interference, and is configured to store a most recently calculated safe trajectory to a stop within the drivable space, and monitor if the control network of the autonomous vehicle is operational;
  wherein, if the brake-control unit determines that the control network of the autonomous vehicle is incapacitated, the brake-control unit is configured to control the wheel brakes of the autonomous vehicle to follow the most recently calculated safe trajectory to a stop within the drivable space stored by the brake-control unit using differential braking of the wheel brakes in order to effectuate steering along the safe trajectory.

* * * * *